United States Patent
Wu (10) Patent No.: US 8,649,326 B2
(45) Date of Patent: Feb. 11, 2014

(54) METHOD OF HANDLING CAPABILITY INFORMATION OF A MOBILE DEVICE AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 219 days.

(21) Appl. No.: 13/175,943

(22) Filed: Jul. 4, 2011

(65) Prior Publication Data

US 2012/0008557 A1 Jan. 12, 2012

Related U.S. Application Data

(60) Provisional application No. 61/361,531, filed on Jul. 6, 2010, provisional application No. 61/425,250, filed on Dec. 21, 2010.

(51) Int. Cl.
*H04W 4/00* (2009.01)

(52) U.S. Cl.
USPC ............................ 370/328; 370/329; 370/331

(58) Field of Classification Search
USPC ......................................... 370/328, 329, 331
See application file for complete search history.

(56) References Cited

U.S. PATENT DOCUMENTS

| | | | |
|---|---|---|---|
| 7,433,334 B2 | 10/2008 | Marjelund | |
| 8,259,681 B2 * | 9/2012 | Lee et al. | 370/338 |
| 8,315,225 B2 * | 11/2012 | Xu et al. | 370/330 |
| 2007/0224988 A1 | 9/2007 | Shaheen | |
| 2008/0219228 A1 * | 9/2008 | Seok et al. | 370/338 |
| 2008/0305825 A1 | 12/2008 | Shaheen | |
| 2009/0116427 A1 * | 5/2009 | Marks et al. | 370/328 |
| 2010/0008309 A1 * | 1/2010 | Cheng et al. | 370/329 |
| 2010/0130217 A1 | 5/2010 | Wu | |
| 2010/0135208 A1 * | 6/2010 | Ishii et al. | 370/328 |
| 2010/0296426 A1 * | 11/2010 | Lee et al. | 370/311 |
| 2011/0019564 A1 * | 1/2011 | De Pasquale et al. | 370/252 |
| 2011/0035639 A1 * | 2/2011 | Earnshaw et al. | 714/748 |
| 2011/0081934 A1 * | 4/2011 | Imamura et al. | 455/522 |
| 2011/0085614 A1 * | 4/2011 | De Pasquale et al. | 375/267 |
| 2011/0086656 A1 * | 4/2011 | Zhou | 455/507 |
| 2011/0105155 A1 * | 5/2011 | Bienas et al. | 455/458 |

(Continued)

FOREIGN PATENT DOCUMENTS

| | | |
|---|---|---|
| CN | 1338192 A | 2/2002 |
| JP | 2002232930 A | 8/2002 |

(Continued)

OTHER PUBLICATIONS

Office Action mailed on Oct. 30, 2012 for the Japanese application No. 2011-150165, filed Jul. 6, 2011, pp. 1-2.

(Continued)

*Primary Examiner* — Ian N Moore
*Assistant Examiner* — Jenee Alexander
(74) *Attorney, Agent, or Firm* — Winston Hsu; Scott Margo (57) ABSTRACT

A method of handling capability information of a mobile device in a wireless communication system is disclosed. The method comprises setting a first device capability recognized by a legacy base station of a network of the wireless communication system, and transmitting the first device capability with a second device capability to the network, to convey the capability information to the network, wherein the second device capability is recognized by an advanced base station of the network.

17 Claims, 5 Drawing Sheets

(56) References Cited

U.S. PATENT DOCUMENTS

| | | | |
|---|---|---|---|
| 2011/0122809 A1* | 5/2011 | Yun et al. | 370/328 |
| 2011/0134896 A1* | 6/2011 | Venkatachalam et al. | 370/338 |
| 2011/0170482 A1* | 7/2011 | Dhanda | 370/328 |
| 2011/0188462 A1* | 8/2011 | Yoo et al. | 370/329 |
| 2011/0194522 A1* | 8/2011 | Zhou | 370/329 |
| 2011/0194529 A1* | 8/2011 | Cho et al. | 370/331 |
| 2011/0205976 A1* | 8/2011 | Roessel et al. | 370/329 |
| 2011/0216735 A1* | 9/2011 | Venkatachalam et al. | 370/331 |
| 2011/0243066 A1* | 10/2011 | Nayeb Nazar et al. | 370/328 |
| 2011/0299489 A1* | 12/2011 | Kim et al. | 370/329 |
| 2011/0306340 A1* | 12/2011 | Lindoff et al. | 455/434 |
| 2011/0317657 A1* | 12/2011 | Chmiel et al. | 370/331 |
| 2011/0319069 A1* | 12/2011 | Li | 455/422.1 |
| 2012/0002614 A1* | 1/2012 | Ekici et al. | 370/329 |
| 2012/0040687 A1* | 2/2012 | Siomina et al. | 455/422.1 |
| 2012/0207115 A1* | 8/2012 | Oh | 370/328 |

FOREIGN PATENT DOCUMENTS

| | | | |
|---|---|---|---|
| JP | 2009530994 A | | 8/2009 |
| JP | 2011507333 A | | 3/2011 |
| KR | 1020080114832 A | | 12/2008 |
| WO | 0054536 | | 9/2000 |
| WO | 2007078043 A2 | | 7/2007 |
| WO | 2007109695 A1 | | 9/2007 |
| WO | 2008137582 A2 | | 11/2008 |
| WO | 2009072956 A1 | | 6/2009 |

OTHER PUBLICATIONS

LG Electronics Inc., Discussion on Access Control of Relay, 3GPP TSG-RAN WG2 #69, R2-101151, Feb. 22-26, 2010, p. 1-2, San Francisco, USA.

3GPP TS 36.331 V9.3.0 (Jun. 2010) Technical Specification 3rd Generation Partnership Project; Technical Specification Group Radio Access Network; Evolved Universal Terrestrial Radio Access (E-UTRA); Radio Resource Control (RRC); Protocol specification (Release 9).

3GPP TS 36.306 V9.2.0 (Jun. 2010) Technical Specification 3rd Generation Partnership Project; Technical Specification Group Radio Access Network; Evolved Universal Terrestrial Radio Access (E-UTRA); User Equipment (UE) radio access capabilities (Release 9).

"Stage 2 description of Carrier Aggregation" 3GPP TSG-RAN WG2 Meeting #70 R2-103427 Montreal, Canada, May 10-14, 2010.

"UE Categories for Rel.10" 3GPP TSG RAN WG1 Meeting #70 R2-103264 Montreal, Canada, May 10-14, 2010.

"Inclusion of new UE categories in Rel-10" 3GPP TSG-RAN Meeting #50 RP-101268 Istanbul, Turkey, Dec. 7-10, 2010.

"Inclusion of new UE categories in Rel-10" 3GPP TSG-RAN Meeting #50 RP-101429 Istanbul, Turkey, Dec. 7-10, 2010.

European patent application No. 11005517.5, European Search Report mailing date: Sep. 29, 2011.

Qualcomm Incorporated, "LTE-A UE Category Assumption", 3GPP TSG-RAN WG2#70, R2-102972, May 10-14, 2010, Montreal, Canada, XP050423209, p. 1.

LTE; Evolved Universal Terrestrial Radio Access (E-UTRA); User Equipment (UE) radio access capabilities (3GPP TS 36.306 version 9.2.0 Release 9), ETSI TS 136 306 V9.2.0 (Jul. 2010), cover page and pp. 1-17.

Office action mailed on Jul. 15, 2013 for the China application No. 201110188180.7, filed Jul. 6, 2011, p. 1-9.

Notice of allowance mailed on Jul. 30, 2013 for the Korean application No. 10-2011-0066815, filed Jul. 6, 2011, pp. 1-2.

3GPP TS 36.306 V11.2.0 (Dec. 2012), 3rd Generation Partnership Project; Technical Specification Group Radio Access Network; Evolved Universal Terrestrial Radio Access (E-UTRA); User Equipment (UE) radio access capabilities (Release 11).

"LTE; Evolved Universal Terrestrial Radio Access (E-UTRA); User Equipment (UE) radio access capabilities (3GPP TS 36.306 version 9.1.0 Release 9)", ETSI TS 136 306 V9.1.0, coverpage, p. 1-2, and 7-9, Apr. 2010.

Office action mailed on Nov. 22, 2013 for the Taiwan application No. 100123827, filing date Jul. 6, 2011, p. 1-6.

* cited by examiner

| UE Category | Maximum number of supported layers for spatial multiplexing in DL | 64QAM in UL |
|---|---|---|
| Category 1 | 1 | No |
| Category 2 | 2 | No |
| Category 3 | 2 | No |
| Category 4 | 2 | No |
| Category 5 | 4 | Yes |
| Category 6 | 2 or 4 | No |
| Category 7 | 2 or 4 | No |
| Category 8 | 8 | Yes |

FIG. 5

METHOD OF HANDLING CAPABILITY INFORMATION OF A MOBILE DEVICE AND RELATED COMMUNICATION DEVICE

CROSS REFERENCE TO RELATED APPLICATIONS

This application claims the benefit of U.S. Provisional Application No. 61/361,531, filed on Jul. 6, 2010, entitled "Method and apparatus for setting UE LTE capability in a wireless communication system", and the benefit of U.S. Provisional Application No. 61/425,250, filed on Dec. 21, 2010, entitled "Method and apparatus for setting UE LTE capability in a wireless communication system", the contents of which are incorporated herein in their entirety.

BACKGROUND OF THE INVENTION

1. Field of the Invention

The present invention relates to a method used in a wireless communication system and related communication device, and more particularly, to a method of handling capability information of a mobile device in a wireless communication system and related communication device.

2. Description of the Prior Art

A long-term evolution (LTE) system, supporting the third generation partnership project (3GPP) Rel-8 standard or the 3GPP Rel-9 standard which are developed by the 3GPP, is now being regarded as a wireless communication system combining a new radio interface and a radio network architecture that provides a high data rate, low latency, packet optimization, and improved system capacity and coverage. In the LTE system, a radio access network known as an evolved universal terrestrial radio access network (E-UTRAN) includes a plurality of evolved Node-Bs (eNBs) for communicating with a plurality of user equipments (UEs) and communicates with a core network including a mobility management entity (MME), serving gateway, etc for NAS (Non Access Stratum) control.

Before a UE starts to exchange wireless signals with an eNB, the eNB must know capability information of the UE which indicates the best capability of the UE such that the eNB can set up system parameters for exchanging the wireless signals with the UE. Therefore, the UE is necessary to transmit the capability information to the eNB, when a communication between the UE and the eNB is established or when the UE is handed over to the eNB from another eNB. After the eNB receives the capability information, the eNB can setup the system parameters according to the capability of the UE.

For example, the UE with a better capability may be capable of receiving high data rate services. Oppositely, the UE with a poorer capability may be only capable of receiving low data rate services. According to the capability information received from the UE, the eNB can provide the high data rate services to satisfy the UE with the better capability, and the eNB can provide the low data rate services to facilitate the UE with the poorer capability to receive the services. In other words, the LTE system prevents the UE with the better capability from receiving the low data rate services by using the capability information, unless the UE notifies the eNB to do so. The LTE system also prevents the UE with the poorer capability from receiving with the high data rate services that the UE cannot process.

In detail, in the LTE system, the capability information is included in a UE-EUTRA-Capability information element (IE) which includes fields such as rf-Parameters, measParameters, ue-Category, etc. More specifically, the ue-Category field includes 5 UE categories, and each UE category defines a set of parameters such as total number of soft channel bits, maximum number of supported layers for spatial multiplexing in downlink (DL), support for 64 quadrature amplitude modulation (QAM), etc.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

The carrier aggregation (CA) is introduced in the LTE-A system by which two or more component carriers are aggregated to achieve a wider-band transmission. When the CA is realized and configured, the LTE-A system can support a wider bandwidth up to 100 MHz by aggregating a maximum number of 5 component carriers, where bandwidth of each component carrier is 20 MHz and is backward compatible with the 3GPP Rel-8 standard. The LTE-A system supports the CA for both continuous and non-continuous component carriers. The CA further increases bandwidth flexibility by aggregating the non-continuous component carriers.

The CoMP is considered for different eNBs at geographically separated locations to coordinate the transmissions and receptions of a UE in the LTE-A system. When the UE is near a coverage edge of an eNB, the UE can also receive signals from neighbor eNBs (including the original eNB) on the DL, and signals transmitted by the UE can also be received by the neighbor eNBs on the UL. Accordingly, the neighbor eNBs can cooperate to reduce the interference from signal transmissions not related to the UE (e.g. by scheduling or beamforming), to improve signal reception of the UE on the DL. The neighbor eNBs may also enhance the signal reception of the UE by transmitting the same data to the UE. On the other hand, the eNBs can combine the received signals from the UE to increase a quality of the received signals on the UL. Therefore, link performance such as data rate and throughput on both the UL and the DL can be maintained or even increased, when the UE is near the coverage edge of the eNB.

The UL MIMO technique is used to achieve higher data rate, higher spectrum efficiency and improved system capacity by enabling parallel data streams to be exchanged between the eNB and the UE. In general, the UL MIMO technique should be implemented by using multiple transmitting antennas at the UE and multiple receiving antennas the eNB. However, even though the eNB can be equipped with the multiple receiving antennas, it is difficult for the UE to be equipped with the multiple transmitting antennas due to a limited size, when the 3GPP developed the LTE system. However, it may be possible that the UE can be equipped with two or four transmitting antennas in the near future with improvement of the semiconductor industry. Therefore, the UL MIMO is adopted to improve performance of the LTE-A system.

Since the best capability of the UE is improved for the LTE-A system, additional capability information is going to be included in the UE-EUTRA-Capability IE. For example, 3 new categories are added in the ue-Category field. Therefore, when a UE supports the 3GPP Rel-10 standard and can be configured with the advanced techniques such as the CA, the CoMP and the UL MIMO, the UE transmits the capability information corresponding to the advanced techniques to an eNB supporting the 3GPP Rel-10 standard, such that the eNB can set up corresponding system parameters. In this situation, the UE and the eNB can communicate with each other by using the advanced techniques, and the high data rate services can be provided to the UE.

On the other hand, the UE supporting the 3GPP Rel-10 standard may be in a coverage of a legacy eNB supporting only the 3GPP Rel-8 standard or the 3GPP Rel-9 standard. When the UE transmits the capability information corresponding to the advanced techniques to the legacy eNB, the legacy eNB cannot recognize the capability information corresponding to the advanced techniques. In this situation, since the legacy eNB does not know the capability of the UE, the legacy eNB may be conservative and treats the UE as a UE with the worst capability. Then, the legacy eNB set up system parameters to maintain only basic transmissions, e.g., the lowest data rate transmissions. In other words, the legacy eNB and the UE communicate with each other by using the worst capability which is lower than that the legacy eNB and the UE can support. Not only the UE suffers from a performance loss, but system throughput degrades. Therefore, how to communicate with the legacy eNB by using the best capability when the UE supporting the advanced techniques is in the coverage of the legacy eNB is a topic for discussion.

SUMMARY OF THE INVENTION

The present invention therefore provides a method and related communication device for handling capability information of a mobile device to solve the abovementioned problems.

A method of handling capability information of a mobile device in a wireless communication system is disclosed. The method comprises setting a first device capability recognized by a legacy base station of a network of the wireless communication system, and transmitting the first device capability with a second device capability to the network, to convey the capability information to the network, wherein the second device capability is recognized by an advanced base station of the network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
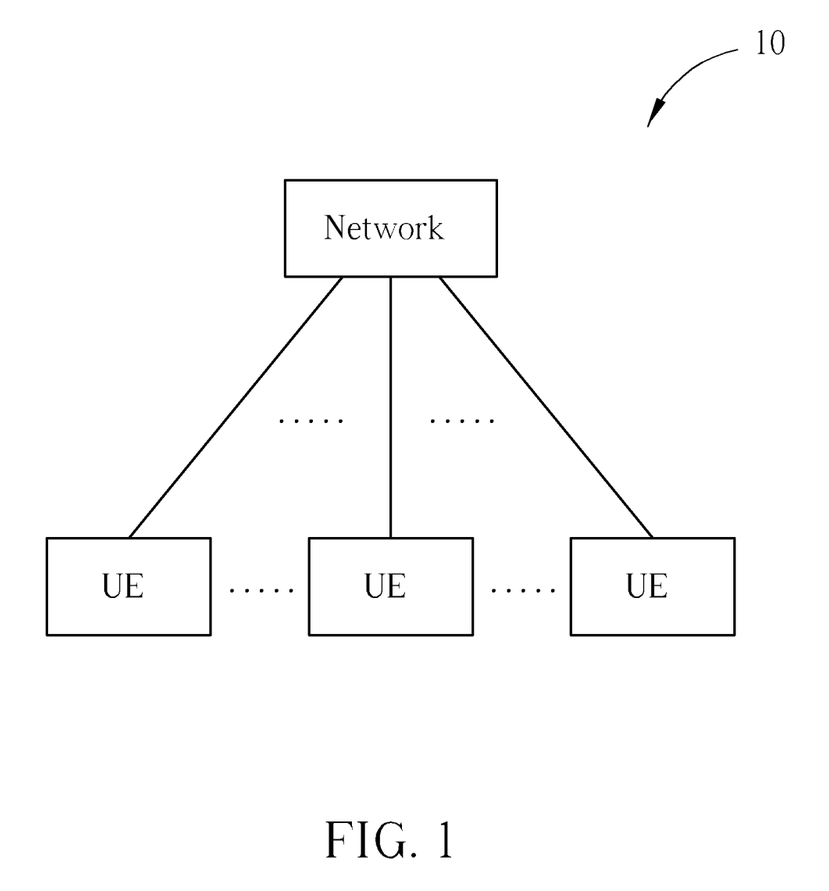
FIG. 1 is a schematic diagram of an exemplary wireless communication system according to the present invention.

Please refer to FIG. 1, which is a schematic diagram of a wireless communication system 10 according to an example of the present invention. The wireless communication system 10, such as a long term evolution-advanced (LTE-A) system or other mobile communication systems supporting a carrier aggregation (CA) coordinated multipoint transmission/reception (CoMP) and UL multiple-input multiple-output (MIMO), is briefly composed of a network and a plurality of user equipments (UEs). In FIG. 1, the network and the UEs are simply utilized for illustrating the structure of the wireless communication system 10. Practically, the network can be referred as to an E-UTRAN (evolved-UTAN) comprising a plurality of evolved Node-Bs (eNBs) and relays in the LTE-A system. The UEs can be mobile devices such as mobile phones, laptops, tablet computers, electronic books, and portable computer systems. Besides, the network and a UE can be seen as a transmitter or receiver according to transmission direction, e.g., for an uplink (UL), the UE is the transmitter and the network is the receiver, and for a downlink (DL), the network is the transmitter and the UE is the receiver.

Figure 2:
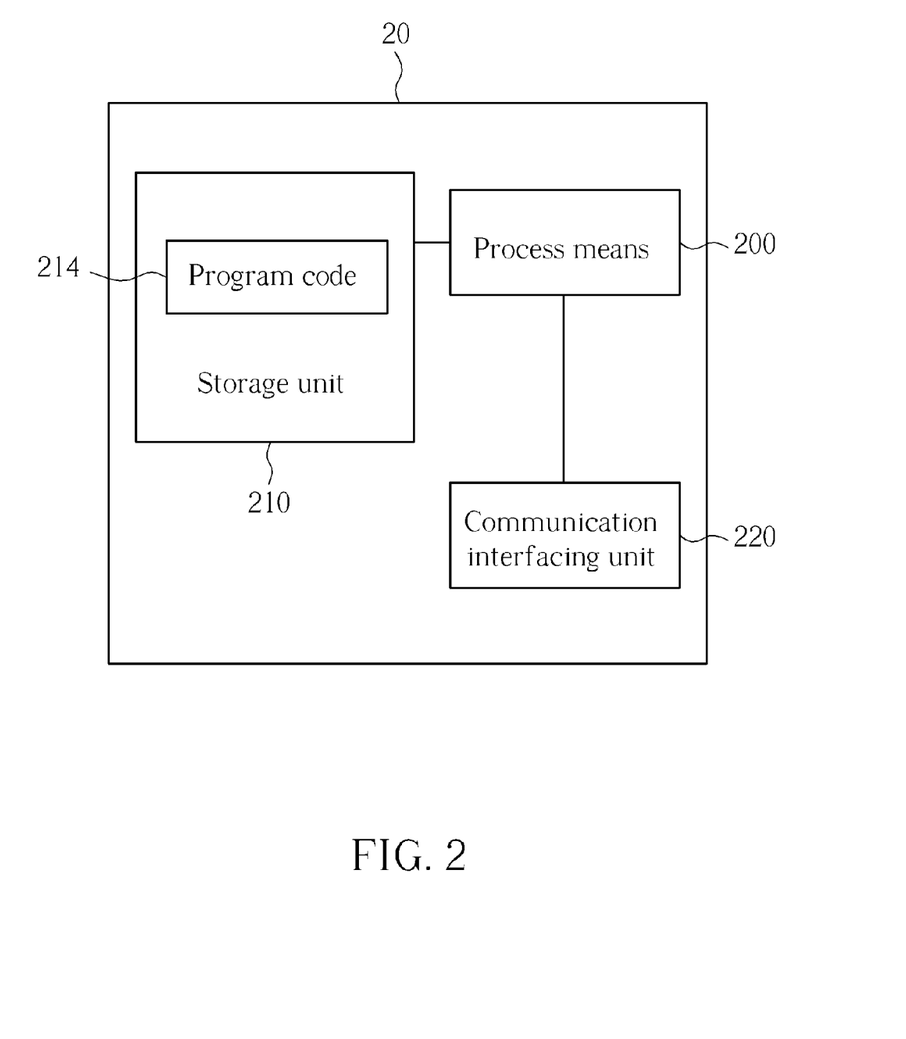
FIG. 2 is a schematic diagram of an exemplary communication device according to the present invention.

Please refer to FIG. 2, which is a schematic diagram of a communication device 20 according to an example of the present invention. The communication device 20 can be the UE or the network shown in FIG. 1, but is not limited herein. The communication device 20 may include a processor 200 such as a microprocessor or Application Specific Integrated Circuit (ASIC), a storage unit 210 and a communication interfacing unit 220. The storage unit 210 may be any data storage device that can store a program code 214, accessed by the processor 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a radio transceiver and can exchange wireless signals with the network according to processing results of the processor 200.

Figure 3:
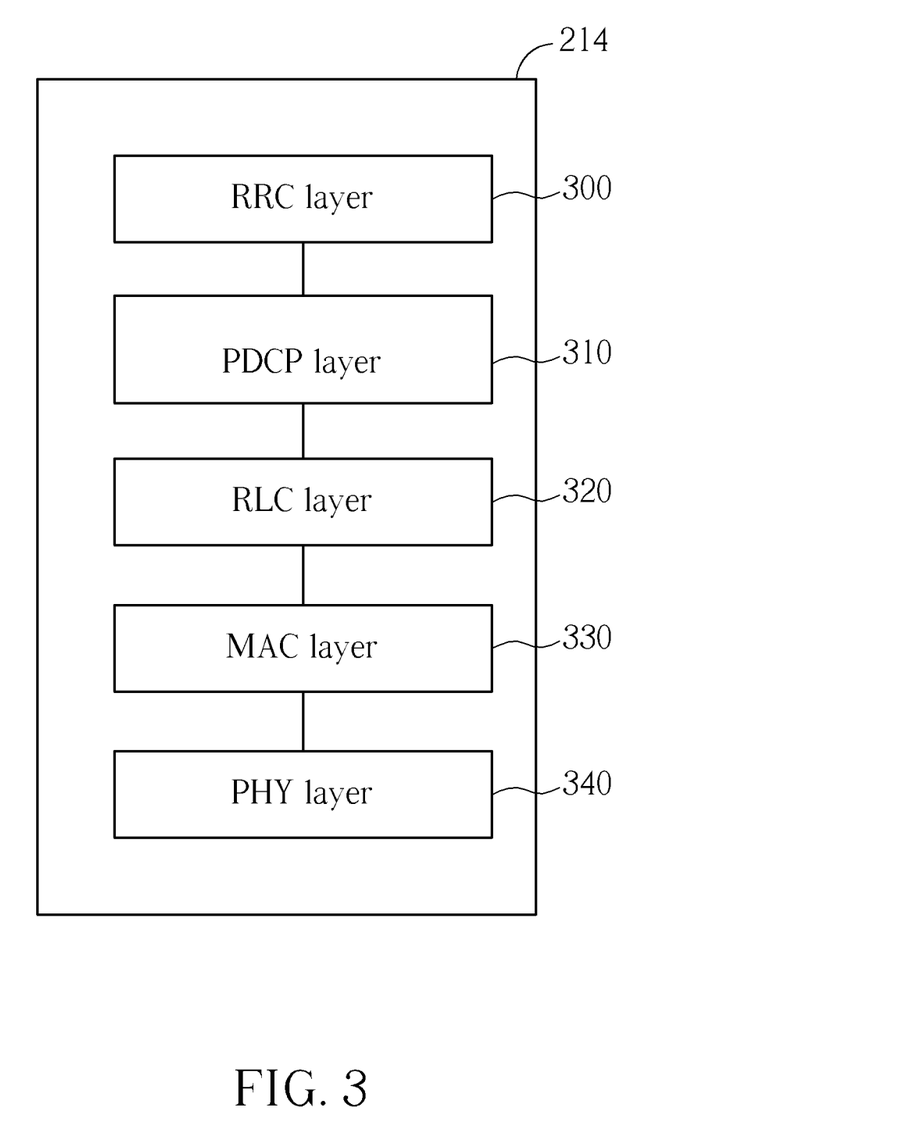
FIG. 3 is a schematic diagram of communication protocol layers for an exemplary wireless communication system.

Please refer to FIG. 3, which illustrates a schematic diagram of communication protocol layers for the LTE-Advanced system. The behaviors of some of the protocol layers may be defined in the program code 214 and executed by the processing means 200. The protocol layers from top to bottom are a radio resource control (RRC) layer 300, a packet data convergence protocol (PDCP) layer 310, a radio link control (RLC) layer 320, a medium access control (MAC) layer 330 and a physical (PHY) layer 340. The RRC layer 300 is used for performing broadcast, paging, RRC connection management, measurement reporting and control and radio bearer control responsible for generating or releasing radio bearers. The PDCP layer 310 is used for header compression, ciphering and integrity protection of transmissions, and maintaining delivery order during a handover. The RLC layer 320 is used for segmentation/concatenation of packets and maintaining delivery sequence when packet loses. The MAC layer 330 is responsible for a hybrid automatic repeat request (HARQ) process, multiplexing logical channels, a random access channel (RACH) procedure and maintaining a UL timing alignment. The PHY layer 340 is used to provide physical channels, e.g. a physical UL shared channel (PUSCH), a physical DL shared channel (PDSCH), a physical UL control channel (PUCCH) and a physical DL control channel (PDSCH).

Figure 4:
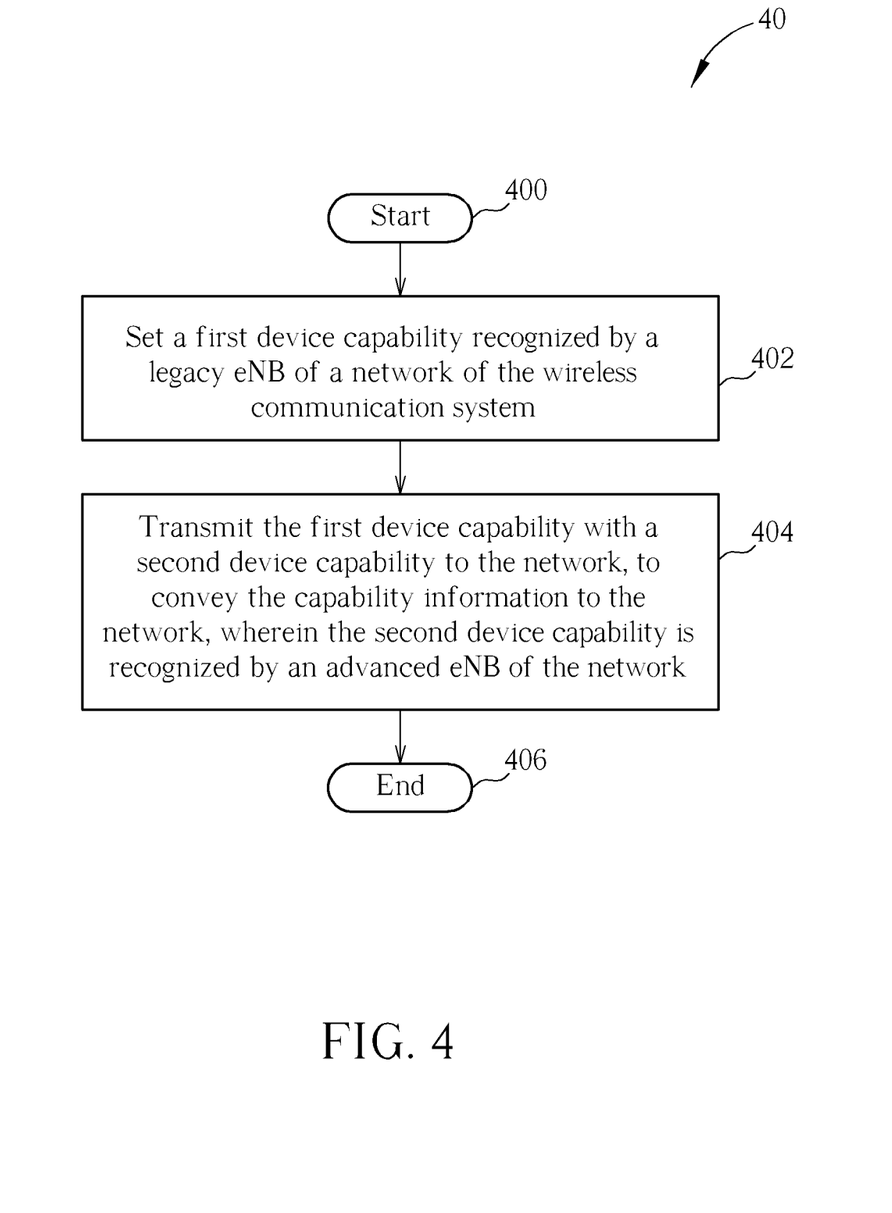
FIG. 4 is a flowchart of an exemplary process according to the present invention.

Please refer to FIG. 4, which is a flowchart of a process 40 according to an example of the present invention. The process 40 is utilized in a UE of the wireless communication system 10 shown in FIG. 1, to handle capability information of the UE. The process 40 may be compiled into the program code 214 and includes the following steps:

Step 400: Start.

Step 402: Set a first device capability recognized by a legacy eNB of a network of the wireless communication system.

Step 404: Transmit the first device capability with a second device capability to the network, to convey the capability information to the network, wherein the second device capability is recognized by an advanced eNB of the network.

Step 406: End.

Before the UE can exchange wireless signals with the network, the eNB must know the capability information of the UE which indicates the best capability of the UE such that the eNB can set up system parameters for exchanging the wireless signals with the UE. According to the process 40, the UE sets the first device capability recognized by the legacy eNB of the network. Then, the UE transmits the first device capability with the second device capability to the network, to convey the capability information to the network, wherein the second device capability is recognized by the advanced eNB of the network. Therefore, whether the capability information is received by the legacy eNB or the advanced eNB, the legacy eNB and the advanced eNB can setup the system parameters according to the capability information included in the first device capability and the second device capability.

In comparison, in the prior art, the UE may transmit capability information which cannot be recognized by the legacy eNB, and the legacy eNB may be conservative and treats the UE as a UE with the worst capability. Therefore, the legacy eNB and the UE communicate with each other by using the worst capability which is lower than that the legacy eNB and the UE can support. Not only the UE suffers from a performance loss, but system throughput degrades.

Please note that, the first device capability is used by the legacy eNB such that when the UE is in a coverage of the legacy eNB, the UE can still receive high data rate services that can be supported by the UE and recognized by the legacy eNB. Content of the first device capability is not limited. For example, the UE can set the first device capability as the best capability that can be supported by the UE and recognized by the legacy eNB, such that the UE can receive the high data rate services from the legacy eNB. Alternatively, the UE can set the first device capability as a capability lower than the best capability that can be supported by the UE and recognized by the legacy eNB according to a choice of the UE. The choice is inputted by a user of the UE or is predefined in the UE. On the other hand, since the best capability of the UE is supported by the advanced eNB, the second device capability is preferably set as the best capability of the UE. Therefore, a relation between the first device capability and the second device capability can be established, to simplify setting the first device capability. In detail, a second device capability is paired with a first device capability. When the second device capability is set, a corresponding first device capability is also determined.

Taking the LTE-A system as an example, a legacy eNB supports only a 3GPP standard with a version equal to or earlier than the 3GPP Rel-9, and a advanced eNB supports a 3GPP standard with a version equal to or later than the 3GPP Rel-10. The UE-EUTRA-Capability information element (IE) defined in the 3GPP standards with the version equal to or later than the 3GPP Rel-10 includes the ue-Category field including 8 categories where each category defines a set of parameters. In this situation, the legacy eNB can only recognize categories 1 to 5 of the ue-Category field, since categories 6 to 8 are added after the 3GPP Rel-9 and can only be recognized by the advanced eNB. In the prior art, when a UE supports the 3GPP standard with the version equal to or later than the 3GPP Rel-10, the UE only sends one of the categories 6 to 8 to an eNB, whether the eNB is the legacy eNB or the advanced eNB. Therefore, when the UE is in a coverage of the legacy eNB, the legacy eNB can not recognize capability of the UE and the legacy eNB may be conservative and treats the UE as a UE with the worst capability.

Figure 5:
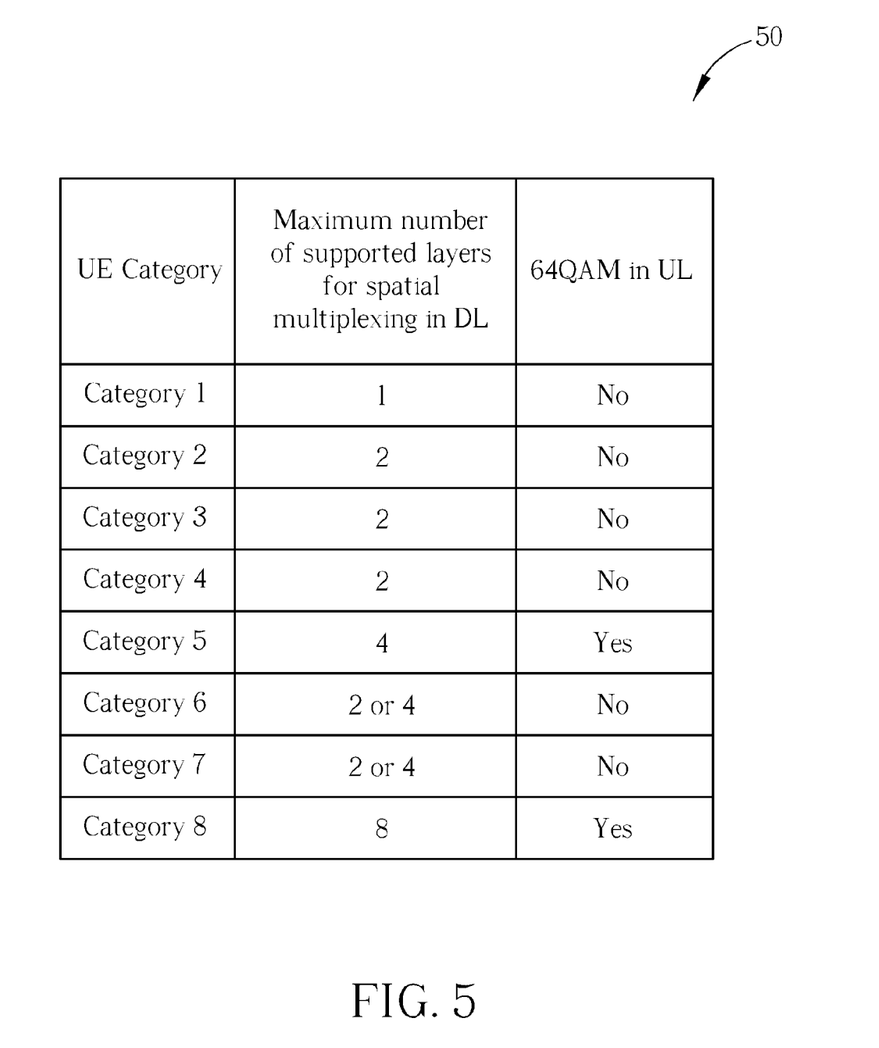
FIG. 5 is a table of the ue-Category according to the present invention.

For further illustration, please refer to table 50 shown in FIG. 5, the table 50 illustrates the ue-Category by listing part of parameters defined by each category, and other parameters are ignored for simplicity. According to the present invention, the UE further transmits one of categories 1 to 5, in addition to transmitting one of the categories 6 to 8. Therefore, the UE can set the first device capability as the category 4, if the second device capability is set as the category 6 or 7. The reason is that the UE does not support 64 quadrature amplitude modulation (QAM) defined in the category 5, and maximum number of supported layers for spatial multiplexing in the DL supported by the UE may be 2 lower than that supported by the category 5. Alternatively, the UE may prefer to use a capability lower than the best capability that can be supported by the UE and recognized by the legacy eNB, to communicate with the legacy eNB. In this situation, the UE can set the first device capability as the category 1, 2, 3 or 4, if the second device capability is set as the category 6 or 7. Besides, when the UE sets the second device capability as the category 8, the UE sets the first device capability as the category 5. Therefore, whether the UE is in a coverage of the legacy eNB or a coverage of the advanced eNB, the UE can receive the high data rate services provided by the legacy eNB or the advanced eNB according to the best capability of the UE.

Please note that, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

In conclusion, the UE supporting the 3GPP Rel-10 standard or later versions transmits two kinds of device capabilities which are respectively recognized by the legacy eNB and the advanced eNB, to the network according to the present invention. Therefore, whether the UE is in a coverage of the legacy eNB or the advanced eNB, the UE can receives the high data rate services according to the best capability of the UE.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling capability information of a mobile device in a wireless communication system, the method comprising:

setting a first device capability recognized by a legacy base station of a network of the wireless communication system; and transmitting the first device capability with a second device capability to the network, to convey the capability information to the network, wherein the second device capability is recognized by an advanced base station of the network;

wherein the legacy base station supports a 3GPP standard with a version equal to or earlier than the 3GPP Rel-9, and the advanced base station supports the 3GPP standard with a version equal to or later than the 3GPP Rel-10;

wherein the first device capability is one of categories 1 to 5 of the ue-Category field defined in the 3GPP standard, and the second device capability is one of categories 6 to 8 of the ue-Category field defined in the 3GPP standard;

wherein the mobile device sets the first device capability as the category 1, 2, 3 or 4, if the mobile device sets the second device capability as the category 6 or 7.

2. The method of claim 1, wherein the second device capability is the best capability of the mobile device.

3. The method of claim 1, wherein setting the first device capability recognized by the legacy base station of the network comprises:
setting the first device capability recognized by the legacy base station of the network according to the best capability of the mobile device.

4. The method of claim 1, wherein setting the first device capability recognized by the legacy base station of the network comprises:
setting the first device capability according to a choice of the mobile device.

5. The method of claim 4, wherein the choice is inputted by a user of the mobile device, or is predefined in the mobile device.

6. The method of claim 1, wherein the first device capability relates to the second device capability.

7. The method of claim 1 further comprising:
setting the first device capability as the category 4, if the mobile device sets the second device capability as the category 6 or 7.

8. The method of claim 1 further comprising:
setting the first device capability as the category 5, if the mobile device sets the second device capability as the category 8.

9. A method of handling capability information of a mobile device in a wireless communication system, the method comprising:
setting a first device capability recognized by a legacy base station of a network of the wireless communication system; and
transmitting the first device capability with a second device capability to the network, to convey the capability information to the network, wherein the second device capability is recognized by an advanced base station of the network;
wherein the legacy base station supports a 3GPP standard with a version equal to or earlier than the 3GPP Rel-9, and the advanced base station supports the 3GPP standard with a version equal to or later than the 3GPP Rel-10;
wherein the first device capability is one of categories 1 to 5 of the ue-Category field defined in the 3GPP standard, and the second device capability is one of categories 6 to 8 of the ue-Category field defined in the 3GPP standard;
wherein the mobile device sets the first device capability as the category 5, if the mobile device sets the second device capability as the category 8.

10. The method of claim 9, wherein the second device capability is the best capability of the mobile device.

11. The method of claim 9, wherein setting the first device capability recognized by the legacy base station of the network comprises:
setting the first device capability recognized by the legacy base station of the network according to the best capability of the mobile device.

12. The method of claim 9, wherein setting the first device capability recognized by the legacy base station of the network comprises:
setting the first device capability according to a choice of the mobile device.

13. The method of claim 12, wherein the choice is inputted by a user of the mobile device, or is predefined in the mobile device.

14. The method of claim 9, wherein the first device capability relates to the second device capability.

15. The method of claim 9 further comprising:
setting the first device capability as the category 4, if the mobile device sets the second device capability as the category 6 or 7.

16. The method of claim 9 further comprising:
setting the first device capability as the category 1, 2, 3 or 4, if the mobile device sets the second device capability as the category 6 or 7.

17. A communication device of a wireless communication system for handling capability information of the communication device, the communication device comprising:
a processing means for executing a program; and
a storage unit coupled to the processing means for storing the program; wherein the program instructs the processing means to perform the following steps:
setting a first device capability recognized by a legacy base station of a network of the wireless communication system; and
transmitting the first device capability with a second device capability to the network, to convey the capability information to the network, wherein the second device capability is recognized by an advanced base station of the network;
wherein the legacy base station supports a 3GPP standard with a version equal to or earlier than the 3GPP Rel-9, and the advanced base station supports the 3GPP standard with a version equal to or later than the 3GPP Rel-10;
wherein the first device capability is one of categories 1 to 5 of the ue-Category field defined in the 3GPP standard, and the second device capability is one of categories 6 to 8 of the ue-Category field defined in the 3GPP standard;
wherein the communication device sets the first device capability as the category 1, 2, 3 or 4, if the communication device sets the second device capability as the category 6 or 7.

* * * * *